(12) United States Patent
Hotta et al.

(10) Patent No.: US 6,520,206 B2
(45) Date of Patent: Feb. 18, 2003

(54) BI-DIRECTIONAL PILOT TYPE ELECTROMAGNETIC VALVES

(75) Inventors: Akihisa Hotta, Bisai (JP); Koichi Suda, Aichi-ken (JP); Takeshi Yamamoto, Aichi-ken (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 09/939,713

(22) Filed: Aug. 28, 2001

(65) Prior Publication Data

US 2002/0029812 A1 Mar. 14, 2002

(30) Foreign Application Priority Data

Sep. 1, 2000 (JP) ........................................ 2000-265782

(51) Int. Cl.[7] ............................................. F16K 31/383
(52) U.S. Cl. .............. 137/614.18; 137/613; 137/614.11
(58) Field of Search ........................... 137/613, 614.11, 137/614.18, 614.19, 614.21; 251/129.15, 129.2, 129.09, 129.1, 30.01, 30.02

(56) References Cited

U.S. PATENT DOCUMENTS

| 3,598,148 A | * | 8/1971 | Kroffke ................. 137/596.16 |
| 4,274,257 A | * | 6/1981 | Koch, Jr. et al. ............. 60/431 |
| 5,188,017 A | * | 2/1993 | Grant et al. ........ 251/129.19 X |
| 5,299,592 A | | 4/1994 | Swanson |
| 5,487,528 A | | 1/1996 | Richmond |
| 5,503,362 A | | 4/1996 | Kim |
| 5,887,847 A | | 3/1999 | Holborow |
| 5,915,665 A | | 6/1999 | Paese |
| 6,155,531 A | | 12/2000 | Holborow |

FOREIGN PATENT DOCUMENTS

| JP | 60104880 | 6/1985 |
| JP | 06193768 | 7/1994 |
| JP | 07190240 | 7/1995 |
| JP | 11063279 | 3/1999 |

* cited by examiner

*Primary Examiner*—Kevin Lee
(74) *Attorney, Agent, or Firm*—Dennison, Schultz & Dougherty

(57) ABSTRACT

Bi-directional pilot type electromagnetic flow valves are capable of preventing reverse flow while utilizing the advantageous properties of pilot type electromagnetic valves. Bi-directional pilot type electromagnetic flow valves may include two pilot type electromagnetic flow valves that are connected in series, but disposed in opposite operational directions. Preferably, one of the pilot type electromagnetic flow valves acts as an anti-reverse flow valve. Therefore, the two-way piping can be switch between a state preventing reverse flow and a state permitting reverse flow. Moreover, a relatively small solenoid coil can be utilized to drive the pilot type electromagnetic valves.

20 Claims, 9 Drawing Sheets

BI-DIRECTIONAL PILOT TYPE ELECTROMAGNETIC VALVES

TECHNICAL FIELD

The present invention relates to two-way or bi-directional pilot type electromagnetic flow valves and bi-directional piping that utilizes such bi-directional pilot type electromagnetic flow valves. In this specification, "two-way" or "bi-directional" is intended to mean a structure having ports A and B, in which a fluid may flow from port A to port B, or conversely, the fluid may flow from port B to port A.

DESCRIPTION OF THE RELATED ART

A known pilot type electromagnetic flow valve is described in Japanese Utility Model Publication No. 59-83262 (1984) and is shown herein in FIG. 1. A body 1 includes a flow inlet port 2 and a flow outlet port 3 that are connected by a passage 4. A valve seat 5 is formed at the upper end of the passage 4. A cup-shaped main valve 6 reciprocates up and down within the body 1. A pilot space 7 is formed inside the main valve 6. A pilot hole 8 is defined at a bottom center of the main valve 6 and a ring shaped protrusion 9 surrounds the pilot hole 8 on the outside bottom surface of the main valve 6. The ring shaped protrusion 9 is free to contact or separate from the valve seat 5. A solenoid coil 10 is provided at the upper end of the body 1 and a plunger 11 and a spring 13 are provided inside the solenoid coil 10. A spherical pilot valve 12 is attached to the tip of the plunger 11. A narrow gap 14 is provided between the outer peripheral surface of the main value 6 and the inside surface of the body 1.

When the solenoid coil 10 is not energized, the pilot valve 12 closes the pilot hole 8 due to the biasing force of the spring 13. When the solenoid coil 10 is energized, the pilot valve 12 is pulled away from the pilot hole 8 due to the magnetic pulling or attracting force of the solenoid coil 10.

Normally, the fluid pressure at the flow inlet port 2 is greater than the fluid pressure at the flow outlet port 3. While the solenoid coil 10 is not energized and the pilot valve 12 closes the pilot hole 8, the pressure difference between the pilot space 7 and the flow outlet port 3, which works on the main valve 6, maintains the main valve 6 at the closed position. It is not required to energize the solenoid coil 12 to maintain the main valve 6 at the closed position. When the solenoid coil 10 is energized and the pilot valve 12 is pulled away from the pilot hole 8, fluid can communicate between the pilot space 7 and the flow outlet port 3, thereby eliminating the pressure difference between the pilot space 7 and the flow outlet port 3. In this condition, greater fluid pressure at the flow inlet port 2 than the pilot space 7 lifts the main valve 6 upwardly, and the ring shaped protrusion 9 will separate from the valve seat 5. Because the fluid pressure supplied to the flow inlet port 2 is greater than the fluid pressure at the flow outlet port 3, fluid will flow from the flow inlet port 2 toward the flow outlet port 3.

The required force for pulling away the pilot valve 12 from the pilot hole 8 by the solenoid coil 10 is much less than a force required for pulling away the main valve 6. A small solenoid coil 10 may be used for opening the pilot type electromagnetic valve that has the pilot valve 12, pilot hole 8 and pilot space 7. If the pilot valve 12, pilot hole 8 and pilot space 7 are not provided, and the main valve 6 is directly connected to the solenoid coil 10, a big solenoid coil 10 is required to pull away the main valve 6 from the valve seat 5, because the great pressure difference between the flow inlet port 2 and the flow outlet port 3 works on the main valve 6 to maintain the main valve 6 at the closed position.

When the main valve 6 should be closed again, the electric current to the solenoid coil 10 is stopped. As a result, the spring 13 causes the pilot valve 12 to contact and close the pilot hole 8. Thus, the high pressure fluid supplied from the flow inlet port 2 passes through the gap 14 into the pilot space 7, thereby pushing the main valve 6 downward as shown in FIG. 1. When the main valve 6 moves downward, the ring shaped protrusion 9 again comes into contact with the valve seat 5 and fluid communication between the flow inlet port 2 and flow outlet port 3 is stopped.

The cross sectional area of the main valve 6 is much bigger than the cross sectional area of the pilot valve 12 and the plunger 11. Therefore the force applied to the main valve 6 due to the pressure difference between the flow inlet port 2 and flow outlet port 3 is much higher than the force applied to the pilot valve 12 due to the pressure difference. If the pilot valve 12 is not provided, a relatively strong force would be required to move the main valve 6 upwardly against the large force due to the pressure difference between the flow inlet port 2 and flow outlet port 3, in order to open the main valve 6. Thus, if the pilot valve 12 is not provided, a solenoid coil 10 capable of generating a relatively strong pulling force is necessary to pull the main valve 6 upward.

However, the pilot valve 12 of the known pilot type electromagnetic flow valve can be easily opened by applying a small pulling force to the pilot valve 12, even if a large pressure difference exists between the flow inlet port 2 and flow outlet port 3. As a result, a relatively small solenoid coil 10 is sufficient to operate the known pilot type electromagnetic flow valve.

Consequently, the known pilot type electromagnetic flow valve, has the advantage of being able to use a small solenoid coil 10 to open the flow path, even when a large pressure difference exists between the flow inlet port 2 and the flow outlet port 3. In order to realize this advantage, the spring 13 must have a relatively small or weak biasing force.

In a typical piping system, the direction of the fluid flow is designed to flow in from the flow inlet port 2 and flow out from the flow outlet port 3 while passing though the pilot type electromagnetic flow valve in an opened state. Thus, the known pilot type electromagnetic flow valve can be utilized in typical piping systems, as long as the fluid pressure at flow inlet port 2 is greater than the flow outlet port 3.

However, if the fluid pressure at the flow outlet port 3 becomes higher than the fluid pressure at the flow inlet port 2, the known pilot type electromagnetic flow valve has little capability to reliably prevent fluid flow in the reverse direction. When relatively high pressure fluid is supplied to the flow outlet port 3, the main valve 6 will easily open, if the biasing force of the spring 13 is relatively small. In the known art, this reverse flow problem can be overcome by substantially increasing the biasing strength of the spring 13. If the spring 13 pushes the valves 6 and 12 downwardly with a greater force, the spring 13 will prevent high pressure fluid supplied to the flow outlet port 3 from opening the main valve 6. However, in this case, a relatively strong force will be required to pull away the pilot valve 12 against the strong biasing force of the spring 13 to open the pilot hole 8, and the advantage of pilot type electromagnetic flow valve will be lost.

Thus, in normal operation (i.e. a relatively high pressure fluid is supplied to the flow inlet port 2), a relatively strong electromagnetic force will be required to open the pilot valve 12 in order to overcome the increased biasing strength of spring 13. Consequently, in order to overcome the reverse flow problem, the advantage of using a pilot type electromagnetic valve will be eliminated, because it will be necessary to use a relatively large solenoid coil in order to supply a sufficient pulling force in order to open the flow path. Thus, the knowing pilot type electromagnetic valve is typically not used in two-way or bi-directional piping, because reverse flow can not be reliably prevented without losing the advantages of the pilot type electromagnetic valve.

SUMMARY OF THE INVENTION

Thus, the known pilot type electromagnetic valve is typically not used in two-way or bi-directional piping, because reverse flow can not be reliably prevented without losing the advantages of the pilot type electromagnetic valve. Instead, an electromagnetic flow valve without a pilot valve is typically used in two-way or bi-directional piping. As a result, a relatively strong spring force is utilized to maintain the valve in the closed position and a relatively strong electromagnetic force is required to open the valve. Thus, the size of the electromagnetic flow valve must be increased and a relatively large amount of energy is consumed in order to operate such a valve in a bi-directional piping system.

Therefore, it is accordingly, one object of the present teachings to overcome at least one problem of the known art. In one aspect of the present teachings, pilot type electromagnetic flow valves are taught that are capable of reliably preventing reverse flow in two-way or bi-directional piping. Such valves provide the advantage that a relatively small biasing force can be utilized to maintain the valve in the closed position and a relatively small electromagnetic force can be utilized to open the valve. Thus, a small solenoid can be utilized, thereby permitting a reduction in the size of the valve. Further, power consumption can be reduced, because the present teachings utilize the advantages of pilot type electromagnetic valves. Hereinafter, pilot type electromagnetic flow valves will sometimes be interchangeably referred to simply as "pilot-assisted valves."

For example, in one embodiment of a two-way piping system described herein, two pilot-assisted valves are disposed between a flow inlet port and a flow outlet port in series and arranged in opposing operational directions. That is, the valve opening directions of the respective pilot-assisted valves are oppositely disposed along the fluid communication path between the two pilot-assisted valves. The particular order in which the pilot-assisted valves are disposed does not matter. However, as shown in FIG. 2 (A) and (B), it is preferable that normal valve opening directions of the pilot-assisted valves are oppositely disposed within the fluid path.

One embodiment of the present teachings is shown in FIG. 2 (A), in which a pilot-assisted valve 22 includes a solenoid coil 27 and a main valve 28 that moves toward the solenoid coil 27 when the solenoid coil 27 is energized, as shown in FIG. 2 (A). Solid line 28a shows the main valve 28 in the valve open position and broken line 28b shows the main valve 28 in the valve closed position. A spring (not shown in FIG. 2(A)) normally biases the main valve 28 towards the valve closed position. The pilot valve is also omitted from FIG. 2 (A) for the purpose of clarity. The pilot-assisted valves 24, 32, and 34 also may preferably have the same structure as the pilot-assisted valve 22, although naturally various designs are possible according to the present teachings. Ports 20, 26, 30, and 36 are also provided to supply and discharge fluid through the two representative examples of two-way or bi-directional piping.

In the piping shown in FIG. 2 (A), the pilot-assisted valves 22 and 24 are disposed in the opposite valve flow directions. That is, the relationship of the open and closed positions of the main valves of the pilot-assisted valves 22 and 24 are disposed in an opposite relationship. In other words, the valve opening directions of the pilot-assisted valves 22 and 24 are oppositely disposed within the fluid communication path. A first port 22a of the first pilot-assisted valve 22 directly communicates with a second port 24b of the second pilot-assisted valve 24 via flow path 23.

In the two-way or bi-directional piping shown in FIG. 2 (B), the pilot-assisted valves 32 and 34 are also disposed in the opposite valve opening directions. More specifically, the first port 32a of the first pilot-assisted valve 32 is connected to the flow port 30, and the second port 34a of the second pilot-assisted valve 34 is connected to the fuel outlet port 36. As a result, the main valve of the first pilot-assisted valve 32 opens towards the left in FIG. 2 (B) and the main valve of the second pilot-assisted valve 34 opens towards the right in FIG. 2 (B).

FIGS. 2 (A) and (B) show two representative embodiments in which pilot type electromagnetic flow valves are disposed in an opposing relationship. In both cases, the arrangement of the flow ports 20, 30 and the first pilot type electromagnetic flow valves 22, 32 is same as the arrangement of the flow ports 26, 36 and the second pilot type electromagnetic flow valves 24, 34. The flow ports 20, 30 may be interchangeably used as the flow inlet port or outlet port. Likewise, the flow ports 26, 36 may be interchangeably used as the flow outlet port or inlet port.

In the configuration shown in FIG. 2 (A), the fluid pressure supplied to port 20 is usually higher than the fluid pressure at port 26. Therefore; when the pilot-assisted valves 22, 24 are open, fluid will flow from port 20 to port 26. Thus, for purpose of discussion, port 20 will be referred to as flow inlet port 20 and the opposing port will be referred to as flow outlet port 26. However, as will be clearly appreciated, because the present valves and piping are bi-directional in nature, port 20 could also be utilized as the flow outlet port and port 26 could be utilized as the flow inlet port.

If a relatively small magnetic pulling force is applied to the pilot valve of the pilot-assisted valve 22 in order to permit fluids to be communicated through the structure shown in FIG. 2(A), the pilot type electromagnetic flow valve 24 will permit the fluid to flow from the flow inlet port 20 toward the flow outlet port 26. When the magnetic pulling force applied to the pilot type electromagnetic flow valve 22 is stopped, the pilot type electromagnetic flow valve 22 will close. At this time, the relatively high pressure fluid supplied to the flow inlet port 20 forces the pilot type electromagnetic flow valve 22 to remain in the closed state.

On the other hand, when the fluid pressure supplied to the flow outlet port 26 is greater than the fluid pressure at flow inlet port 20, the pilot type electromagnetic flow valve 24 can act as anti-reverse flow valve, thereby stopping or preventing reverse flow from fuel outlet port 26 to fuel inlet port 20. By disposing two pilot type electromagnetic flow valves in series and in opposing operational directions, reverse flow can be reliably stopped or prevented. Further, when a relatively high pressure fluid is supplied to the flow outlet port 26, the pilot type electromagnetic flow valve 24 can still be opened with a small magnetic pulling or attracting force. If pilot type electromagnetic flow valve 24 is opened, fluid will flow in the reverse direction from the flow outlet port 26 toward the flow inlet port 20.

Further, when a relatively high pressure fluid is supplied the flow inlet port 20, the fluid path will remain closed due to the pilot type electromagnetic flow valve 22, unless the solenoid coil 27 of the pilot type electromagnetic flow valve 22 is energized. That is, by passing electric current through the solenoid coil 27, the pilot type electromagnetic flow valve 22 will be opened. When high pressure fluid is applied at the flow outlet port 26, the fluid path will remain closed due to the pilot type electromagnetic flow valve 24, unless the solenoid coil 27 of the pilot type electromagnetic flow valve 24 is energized. That is, by passing electric current through the solenoid coil 27, the pilot type electromagnetic flow valve 24 will be opened. According to this piping arrangement, the flow inlet port 20 and the flow outlet port 26 can communicate fluids only when so desired, and unintentional communication of fluids can be prevented.

When a relatively high pressure fluid is supplied the flow inlet port 20, the fluid path will remain closed due to the valve 22 unless the solenoid coil 27 of the valve 22 is energized. The fluid path will open by energizing the solenoid coil 27 of the valve 22. It is not required to energize the valve 24 to open the fluid path.

When a relatively high pressure fluid is supplied the flow outlet port 26, the fluid path will remain closed due to the valve 24 unless the solenoid coil 27 of the valve 24 is energized. The fluid path will open by energizing the solenoid coil 27 of the valve 24. It is not required to energize the valve 22 to open the fluid path.

Thus, a two-way piping system is provided that is capable of switching between the states of open communication and closed communication as desired by the pilot type electromagnetic flow valves.

Referring to the configuration shown in FIG. 2 (B), a relatively high pressure fluid may be supplied to port 30, which will be referred to as flow inlet port 30 for the purposes of discussion. Further, the port 36 that opposes flow inlet port 30 will be referred to as the flow outlet port 36. Similar to the embodiment shown in FIG. 2 (A), the orientation of ports 30 and 36 can be freely changed to refer to these ports as flow outlet port 30 and flow inlet port 36.

In the embodiment shown in FIG. 2 (B), when the fluid pressure at the flow inlet port 30 is greater than the fluid pressure at the flow outlet port 36 and the pilot type electromagnetic flow valve 34 is opened by applying a small magnetic pulling force, the pilot type electromagnetic flow valve 32 will permit fluid to flow from the flow inlet port 30 toward the flow outlet port 36. That is, the valve 32 is not capable of stopping flow from the flow inlet port 30 to the flow outlet port 36. When the fluid pressure at the flow inlet port 30 is greater than the fluid pressure at the flow outlet port 36 and the valve 34 is not energized, the valve 34 stops the flow from the flow inlet port 30 toward the flow outlet port 36 even if the valve 32 is not capable of stopping flow from the flow inlet port 30 to flow outlet port 36.

If the fluid pressure at the Bow outlet port 36 is greater than the fluid pressure at the flow inlet port 30 and the pilot type electromagnetic flow valve 32 is opened by applying a small magnetic pulling force, the pilot type electromagnetic flow valve 34 will permit fluid to flow from the flow outlet port 36 toward the flow inlet port 36. That is, the valve 34 is not capable of stopping flow from the flow outlet port 36 to the flow inlet port 30. When the fluid pressure at the flow outlet port 36 is greater than the fluid pressure at the flow inlet port 30 and the valve 32 is not energized, the valve 32 stops the flow from the flow outlet port 36 toward the flow inlet port 30 even if the valve 34 is not capable of stopping flow from the flow outlet port 36 to flow inlet port 30.

Thus, the piping arrangement shown in FIG. 2 (B) also provides a two-way piping system that is capable of switching between open and closed states as desired by the pilot type electromagnetic flow valves.

The two examples of two-way piping shown in FIG. 2 (A) and (B) are believed to be based upon a novel concept. In the known art, a single electromagnetic valve is used in two-way piping. The electromagnetic valve used in two-way piping is biased closed using a relatively large spring and the valve is opened using a relatively strong electromagnetic force. However, the piping arrangements shown in FIG. 2 (A) and (B) can utilize the advantages of pilot type electromagnetic flow valves. Thus, the pilot-assisted electromagnetic valve can be opened using a relatively small solenoid coil while still reliably preventing unintended or undesired reverse flow. In addition, the two-way piping can easily switch between the states of preventing reverse flow and permitting reverse flow. Moreover, the advantages of the pilot type electromagnetic flow valve can be realized in the present teachings, because a small solenoid coil can be utilized to switch the flow states.

Thus, in one embodiment of the present teachings, a two-way pilot type electromagnetic flow valve includes two pilot type electromagnetic flow valves connected in series and arranged in opposing valve opening directions. The two pilot type electromagnetic flow valves may preferably be disposed within a common body. Such a two-way pilot type electromagnetic flow valve may utilize a relatively small solenoid coil to open the valve and prevent reverse flow in addition to switching to permit reverse flow.

Although the movable valves of the two pilot type electromagnetic flow valves are preferably arranged in a straight line, other arrangements can be utilized. For example, if a straight-line is utilized, the two-way pilot type electromagnetic flow valves can be made narrow. In the alternative, the movable valves of two pilot type electromagnetic flow valves can be arranged in parallel, thereby realizing a shorter two-way pilot type electromagnetic flow valve.

In addition or in the alternative, the two movable valves may preferably share a common solenoid coil, thereby permitting the two movable valves to be moved (biased) using a single solenoid coil. Therefore, two movable valves can be simultaneously moved to open or close the valves and the number of parts can be minimized.

However, it is also possible to provide a solenoid coil for each of the two movable values, thereby simplifying the design and production of a two-way pilot type electromagnetic flow valve. If each of the two movable valves has its own solenoid coil, electric current can be passed to either one of the two solenoid coils in order to open the flow path. The pilot type electromagnetic flow valve can be switched easily to an opened state when a relatively high pressure fluid is applied to the flow outlet port. Thus, this method can be utilized to energize the solenoid coil and open the valve. In other words, instead of passing electric current to both of the two solenoid coils in order to open the two pilot type electromagnetic flow valves, one of the, pilot type electromagnetic flow valves can be opened by the fluid pressure differential. Thus, power consumption can be reduced if only one solenoid coil is energized during operation.

These aspects and features may be utilized singularly or in combination in order to make improved two-way pilot type electromagnetic flow valves. In addition, other objects, features and advantages of the present teachings will be readily understood after reading the following detailed description together with the accompanying drawings and

BRIEF DESCRIPTION OF THE DRAWINGS

FIG. 2 (B) shows another block diagram of two pilot type electromagnetic flow valves oppositely disposed within a pipe.

DETAILED DESCRIPTION OF THE INVENTION

Pilot type electromagnetic flow valves are also known in the art, for example, as "pilot-operated directional control valves" and "pilot solenoid valves." Such names can be used interchangeably with the present teachings as well as the term "pilot-assisted valves," all of which are intended to have the same meaning. A pilot type electromagnetic flow valve is a type of directional control valve typically that is used for switching the flow of a pressurized fluid, such as compressed air or pressurized fluids.

A pilot type electromagnetic flow valve typically includes a main valve and a pilot valve disposed within the main valve. The pilot valve is normally biased in the closed position by a spring. Further, fluid pressure differential across the main valve typically assists in maintaining the main valve in the closed position.

In order to open the main valve, the pilot valve is first opened by applying a magnetic pulling force to the pilot valve. As a result, the fluid pressure differential across the main valve is equalized and greater pressure at the flow inlet port will cause the main valve to open. In order to close the main valve, the magnetic pulling force is discontinued, thereby causing the pilot valve to close, due to the biasing force of the spring. As a result, fluid pressure against the main valve will increase and thereby force the main valve towards the closed position.

Each of the additional features and method steps disclosed above and below may be utilized separately or in conjunction with other features and method steps to provide improved bi-directional flow valves and methods for making and using the same. Representative examples of the present teachings, which examples will be described below, utilize many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures. Of course, features and steps described in this specification may be combined in ways that are not specifically enumerated in order to realize other usual and novel embodiments of the present teachings, which combinations are contemplated by the present inventors.

First Detailed Representative Embodiment

Figure 1:
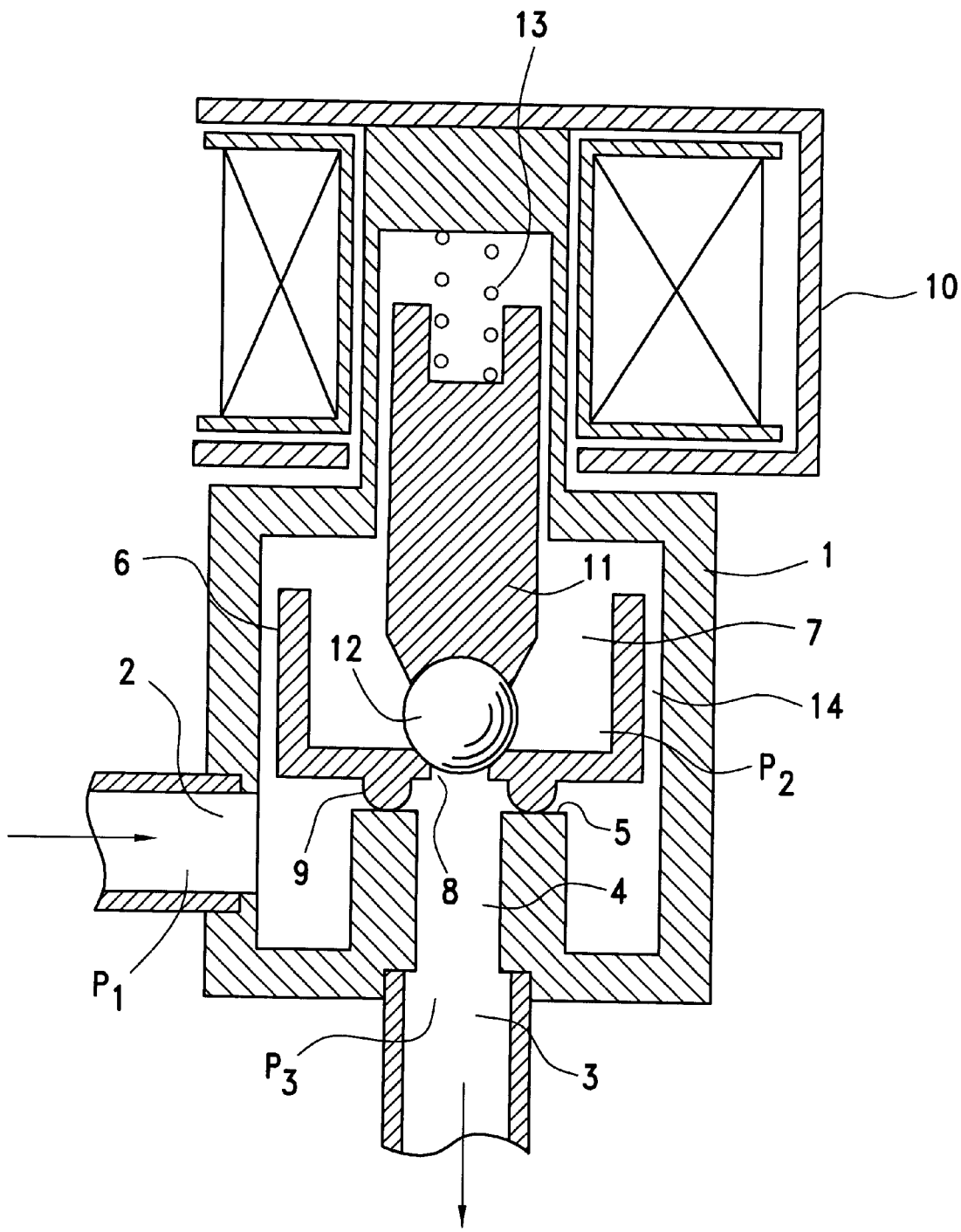
FIG. 1 shows the cross section of a known pilot type electromagnetic flow valve.
Figure 2A:
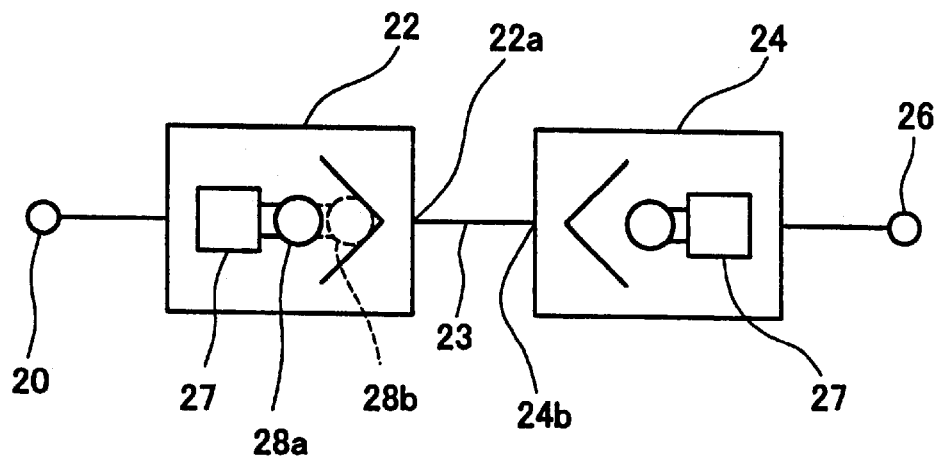
FIG. 2 (A) shows a block diagram of two pilot type electromagnetic flow valves oppositely disposed within a pipe.
Figure 2B:
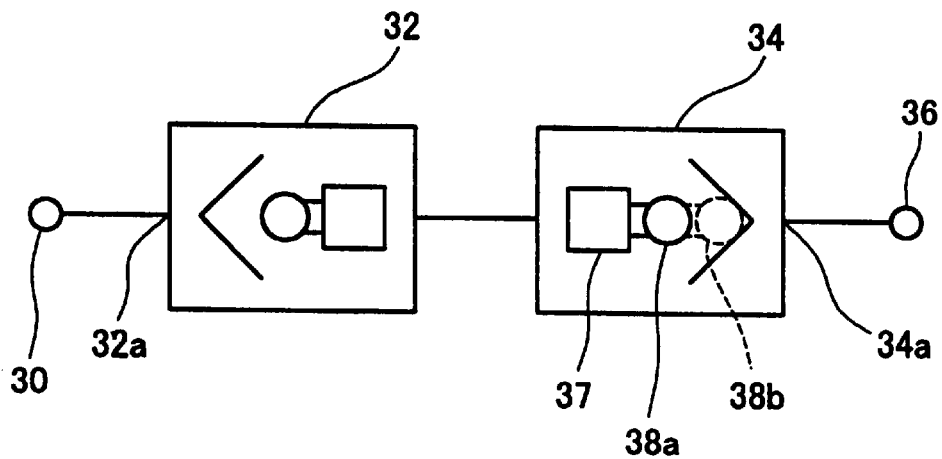
Figure 3:
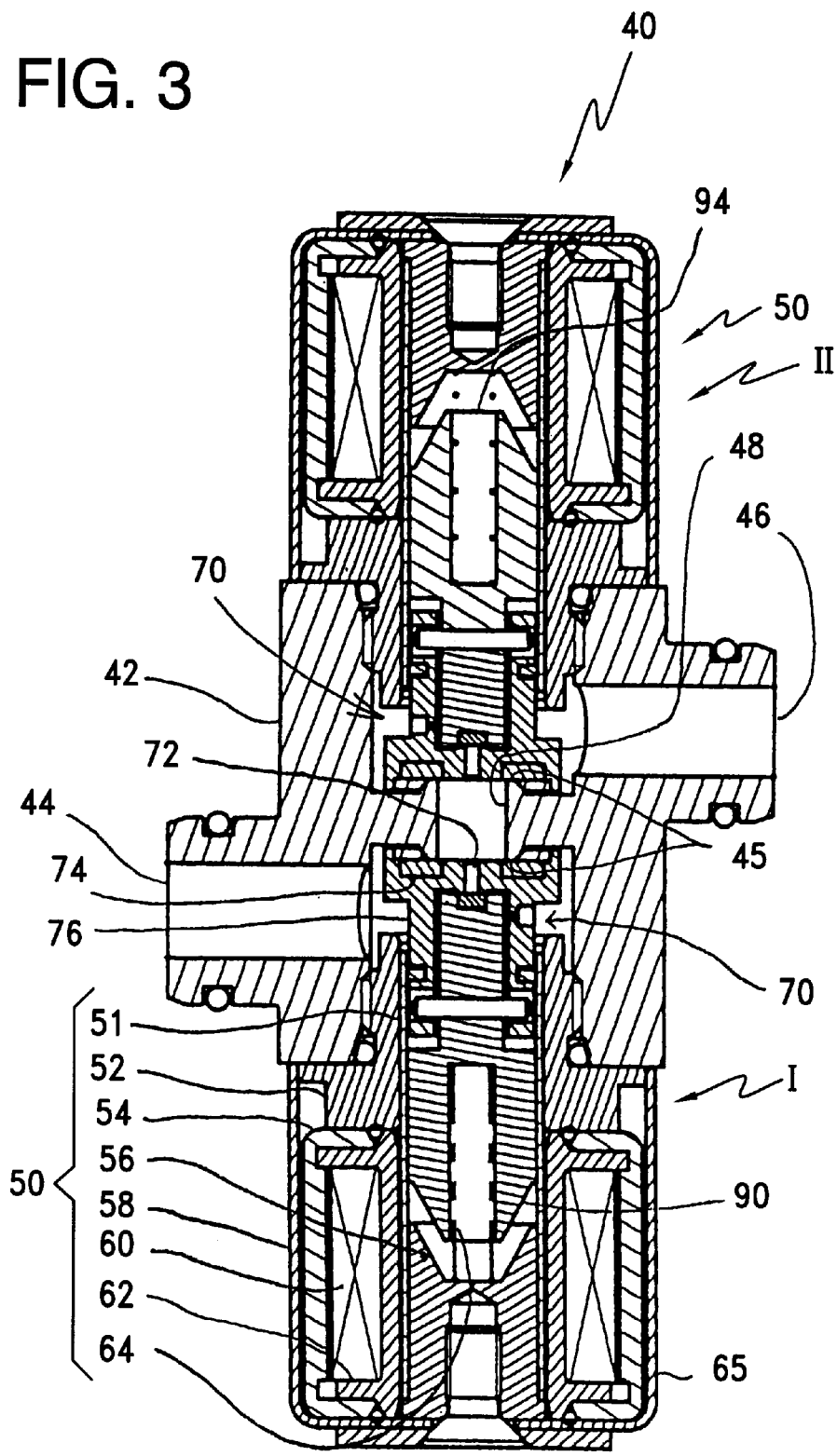
FIG. 3 shows a first representative two-way pilot type electromagnetic flow valve according to the present teachings.

Referring to FIG. 3, a cross sectional drawing of the first representative two-way pilot type electromagnetic flow valve 40 is shown. This two-way pilot type electromagnetic flow valve 40 includes two pilot type electromagnetic flow valves (I, II) that are disposed within common body (or enclosure) 42. In this embodiment, the two pilot type electromagnetic flow valves (I, II) are connected in series and placed in opposite valve opening directions. Each pilot type electromagnetic flow valve (a II) preferably includes a moveable valve 70 and electromagnetic force generator (solenoid) 50, which may include for example, a solenoid coil 60. Although pilot-type electromagnetic flow valves (I, II) may both preferably utilize the same construction, naturally the pilot-type electromagnetic flow valves (I, II) may be assembled with different constructions.

Figure 4:
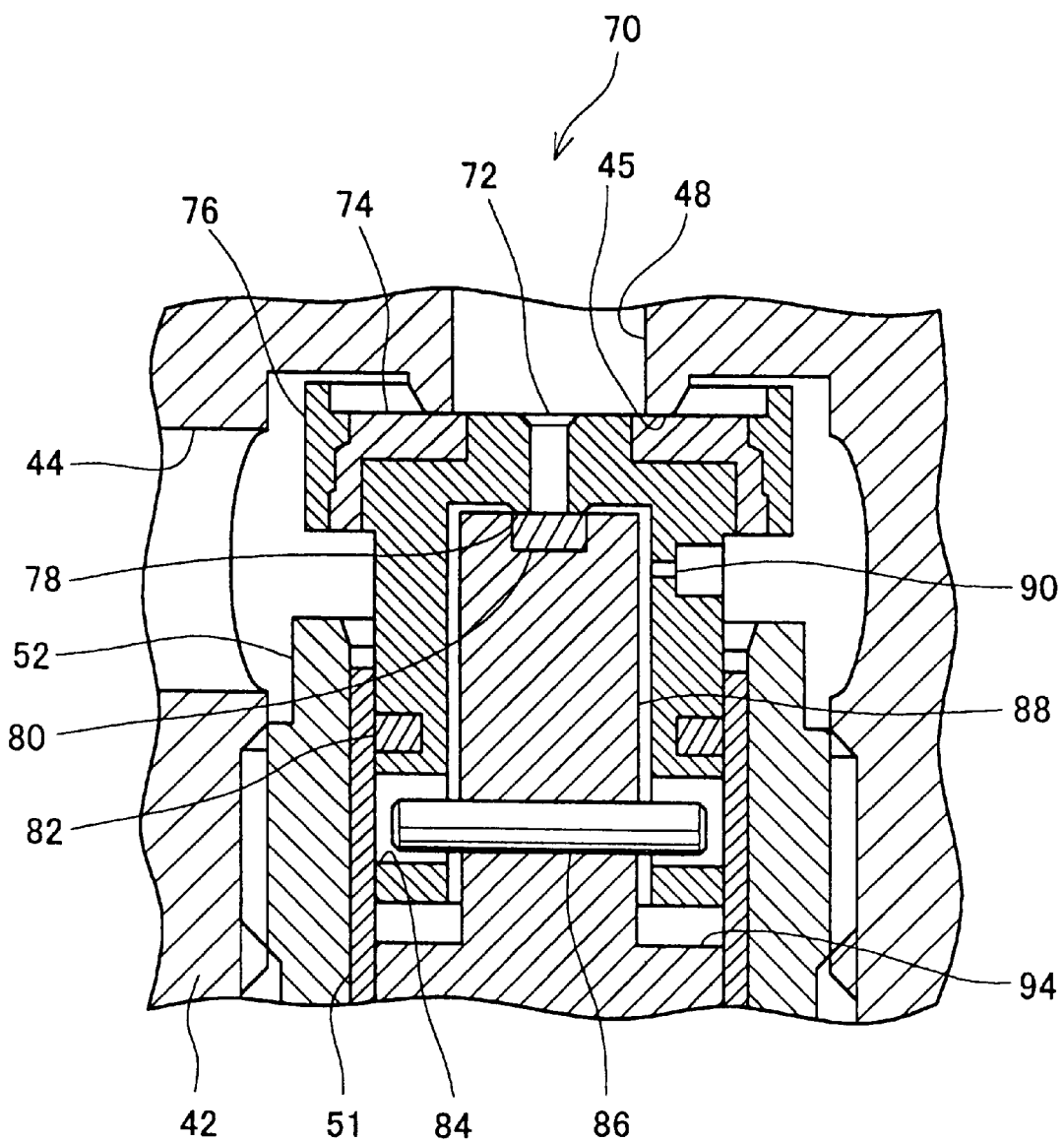
FIG. 4 shows a cross section of the movable valve of FIG. 3 in the closed state.
Figure 5:
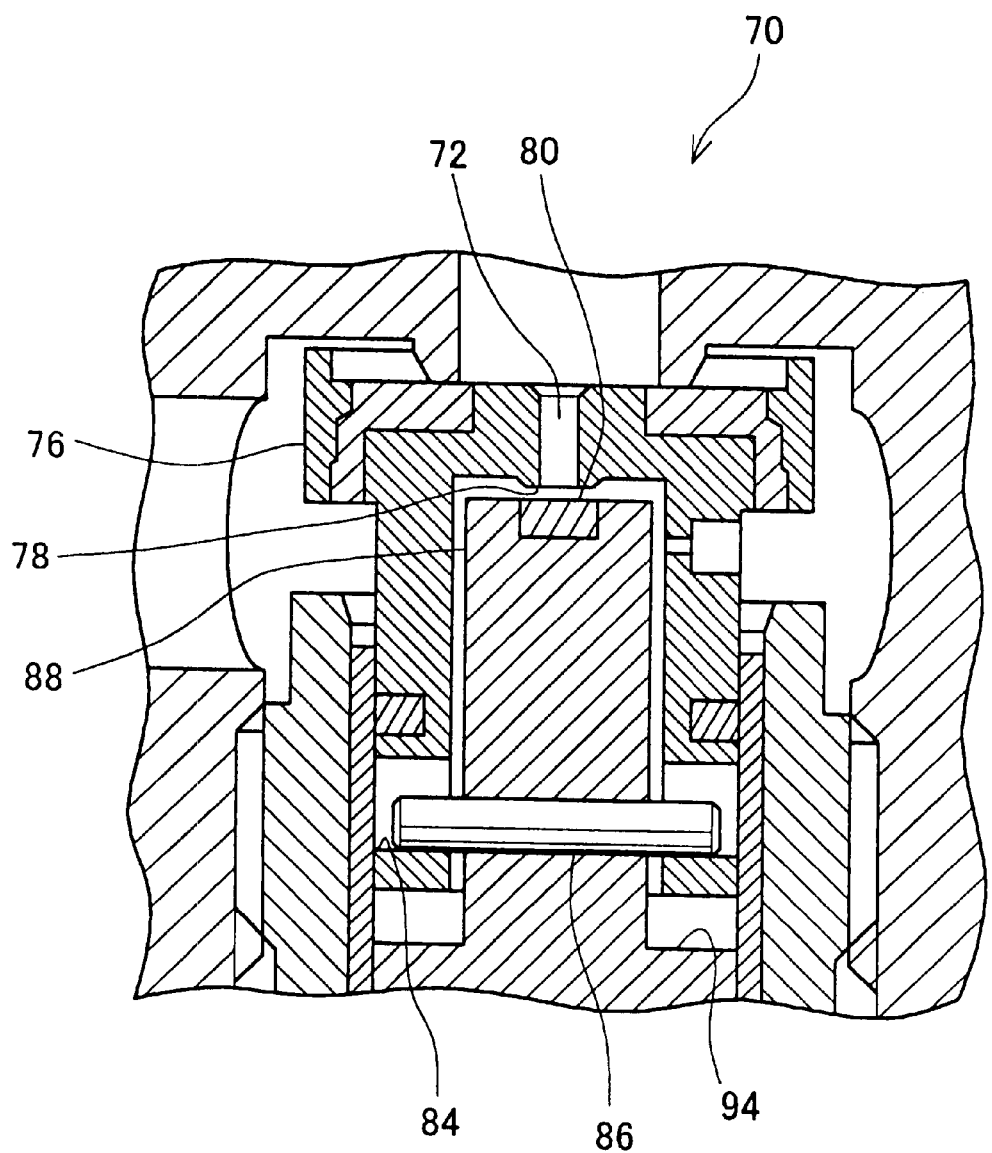
FIG. 5 shows a cross section of the movable valve of FIG. 3 when the pilot valve is opened.
Figure 6:
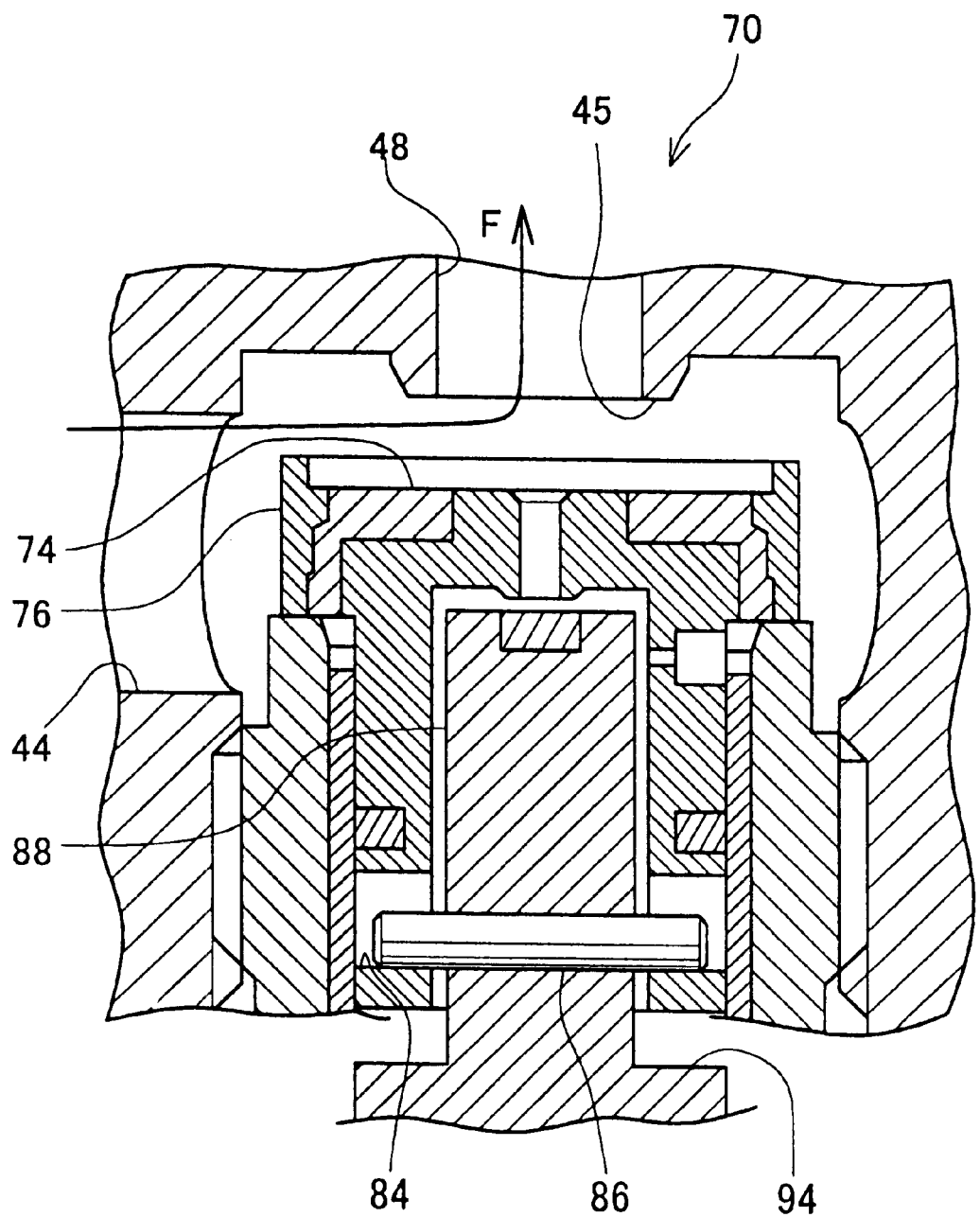
FIG. 6 shows a cross section of the movable valve of FIG. 3 when the main valve is opened.

The movable valve 70 of each pilot-type electromagnetic flow valve I and II will be explained in greater detail with reference to FIGS. 4–6, which show magnified cross sectional drawings of the movable valve 70. Specifically, FIG. 4 shows the state in which the movable valve 70 Is closed. FIG. 5 shows the state in which the pilot valve 88 is opened, but the main valve 76 is still closed. FIG. 6 shows the state in which both the pilot valve 88 and the main valve 76 are opened.

Preferably, the primary components of the movable valve 70 include a main valve 76 and a pilot valve 88. The main valve 76 may be substantially cylinder-shaped with differing inner and outer diameters. A pilot hole 72 is preferably provided at substantially the center of the tip of the main valve 76 and a ring shaped or annular seal 74 may be disposed to substantially surround the pilot hole 72. A ring shaped or annular valve seat 78 preferably surrounds the pilot hole 72 on the inner edge surface of the main valve 76. An orifice 90 penetrates through the sidewall of the main valve 76.

A piston ring 82 is preferably mounted on the outer periphery of the main valve 76 in order to provide a fluid seal between the pipe 51 and the main valve 76, as will explained in further detail below. The piston ring 82 also may serve as a sliding guide. A pair of penetrating holes 84 may be defined near the rear edge of the main valve 76 in order to accommodate the respective ends of a pin 86 that is attached to the pilot valve 88, as will be described below in further detail. The opening length of each through hole 84 in the axial direction of the through hole 84 is preferably greater than the diameter of the pin 86.

The pilot valve 88 also preferably has a cylindrical shape with an outer diameter that allows the pilot valve 88 to slide inside the main valve 76 with a clearance therebetween. A seal 80 optionally may be disposed at the tip of the pilot valve 88 in a position that will contact the valve seat 78 of the main valve 76. The pin 86 is disposed near the rear edge of the pilot valve 88, which rear edge of the pilot valve 88 forms a plunger 94.

The structure of the electromagnetic force generator 50 will be explained with reference to FIG. 3, which electromagnetic force generator 50 also may be interchangeably referred to as solenoid 50. A cylindrical pipe 51 is inserted inside a bobbin 62 and inside a hollow shaped base 52. The main valve 76 and plunger 94, which were explained above, are slidably inserted into the pipe 51. In addition, a stator 56 is also inserted into and fixed to the pipe 51. A spring 64 is disposed between the stator 56 and the plunger 94.

A solenoid coil 60 is wound around the outer periphery of the bobbin 62 and the bobbin 62 and the coil cover 54 seal the solenoid coil 60. Thus, all the parts of the electromagnetic force generator 50, including the solenoid coil 60, are accommodated inside th e case 58 and are fixed to the base 52.

The base 52 of the electromagnetic force generator 50 is fixed to the body 42. In this fixed state, the movable valve 70 of the pilot type electromagnetic flow valve I is positioned in the body 42 so as to communicate with the flow inlet port 44, which is defined within the body 42. The pilot hole 72 of the movable valve 70 faces the communication path 48. Additionally, the seal 74 of the movable valve 70 can contact the valve seat 45 provided in the body 42. In FIGS. 3 and 4, the seal 74 is shown as contacting the valve seat 45.

A flow outlet port 46 is also defined within the body 42. A pilot type electromagnetic flow valve II, which can be equivalent to the above-described pilot type electromagnetic flow valve I or may have a different design, is accommodated in the space that communicates with the flow outlet port 46. The space between the flow inlet port 44 and the communication path 48 is opened or closed by the movable valve 70 of the valve I. The space between the flow outlet port 46 and the communication path 48 is opened or closed by the movable valve 70 of the valve II.

A representative method for operating the first representative two-way pilot type electromagnetic flow valve 40 will now be explained with reference to FIGS. 4–6. FIG. 4 shows both the pilot valve 88 and main valve 76 in the closed state, in which the seal 80 contacts the valve seat 78, because the spring 64 (FIG. 3) biases the pilot valve 88 towards the valve seat 78. Additionally, the seal 74 contacts the valve seat 45, because the pilot valve 88 biases the main valve 76. As pressurized fluid flows into the body 42 via the flow inlet port 44, the pressure near the outer periphery of the main valve 76 will become higher than the pressure in the communication path 48, which communicates with the pilot hole 72. Consequently, the pressurized fluid that enters via flow inlet port 44 will enter the clearance (i.e., gap or space) between the pilot valve 88 and main valve 76 via the orifice 90. Therefore, the fluid pressure within the clearance between the pilot valve 88 and the main valve 76 will reach equilibrium with the fluid pressure near the outer periphery of the main valve 76.

Thus, when pressurized fluid is supplied to flow inlet port 44, the seal 74 of the main valve 76 will be biased against the valve seal 45. Further, as long as high pressure fluid is applied to the flow inlet port 44, this pressure will act to close the main valve 76.: Therefore, the movable valve 70 of this first representative example will maintain its closed state while high pressure fluid is applied at the flow inlet port 44, due to the spring or biasing force of spring 64 as well as the fluid pressure differential across main valve 76.

FIG. 5 shows the state in:which the pilot valve 88 starts to open from the closed state shown in FIG. 4. The state shown in FIG. 5 will be referred to herein as "the pre-opened state." In the pre-opened state, the pilot valve 88 connected to the plunger 94 is biased by the magnetic pulling force of the solenoid coil 60 in the direction to open the valve 70. Preferably, the biasing force of the spring 64, which is maintaining the pivot valve 88 in the closed state, is less than the magnetic pulling or attracting force of the solenoid coil 60. Consequently, the seal 80 will separate from the valve seat 78 and the pin 86 will bias or pull the main valve 76 downward as shown in FIG. 5.

Even if relatively high pressure fluid is applied to the flow inlet port 44, the pilot valve 88 can be opened with a relatively small magnetic pulling or attracting force. The magnetic pulling force can be much less than the magnetic pulling force that would be required to directly open the main valve 76 against the fluid pressure, if the pilot valve 88 was not provided. As noted above, the biasing force of spring 64 is also less than this magnetic pulling force supplied by solenoid coil 60.

When the pilot valve 88 opens, the pressure between the pilot valve 88 and the main valve 76 decreases because the area of the flow path of the pilot hole 72 is greater than the area of the flow path of the orifice 90. Consequently, the pressure differential, which was acting to bias the main valve 76 towards the closed position, decreases. As the fluid pressure differential across the main valve 76 decreases or equilibrates, the force in the direction of closing the main valve 76 is also reduced. Therefore, the magnetic pulling force supplied by solenoid coil 60 will cause the main valve 76 to move downward.

FIG. 6 shows the main valve 76 in the opened condition, which will be simply referred to as "the opened state." In the opened state, the plunger 94 is biased downward, as shown in FIG. 6, due to the electromagnetic force of the solenoid coil 60, which is greater than the biasing force of spring 64. Consequently, the pin 86 forces the main valve 76 to move downward as shown in FIG. 6, whereby the valve seal 74 will separate from the valve seat 45. As a result, pressurized fluid will flow from the flow inlet port 44 into the communication path 48 as shown by arrow F in FIG. 6.

If the electric current being supplied to the solenoid coil 60 is stopped in this state, the pilot valve 88 will move upward as shown in FIG. 4, due to the biasing force of the spring 64. Therefore, the seal 80 will contact valve seat 78 and close the pilot hole 72. The biasing force of the spring 64 will be transmitted to the main valve 76 via the pin 86, thereby causing the seal 74 of the main valve 76 to contact the valve seat 45. Thus, the pilot valve 88 will return to the closed state, as shown in FIG. 4. As the main valve 76 closes, a pressure difference is again generated across the two opposing sides of the main valve 76. Consequently, the additional force provided by this fluid pressure differential will assist in maintaining the main valve 76 in the closed state.

In the first representative two-way pilot type electromagnetic flow valve 40, the movable valves 70 are connected in series and disposed in opposite operational directions. That is, as shown in FIG. 3, electromagnetic valve I opens when the main valve 76 moves downwardly. To the contrary, electromagnetic valve II will open when the main valve 76 moves upwardly. Both valves 70 are accommodated within the body 42 and communicate via communication path or passage 48.

A representative method for causing fluid to flow from the flow inlet port 44 to the flow outlet port 46 via the two movable valves 70 will be explained with reference to the first representative embodiment. For example, electric current is passed through the solenoid coil 60 that is disposed on the side of flow inlet port 44 in order to open the movable valve 70 on the side of flow inlet port 44 (i.e. electromagnetic valve I will open). Then, fluid will flow into the communication path 48 from the flow inlet port 44, as shown by arrow F in FIG. 6. Because the pressure within the communication path 48 becomes higher than the pressure at the flow outlet port 46, the movable valve 70 on the side of the flow outlet 46 will open, due to this pressure differential (i.e. electromagnetic valve II will also open). Thus, it is not necessary to pass electric current through the solenoid coil 60 in the side of the flow outlet port 46 in order to open the electromagnetic valve II. Because the biasing force of spring 64 is relatively small, the electromagnetic valve II does not have sufficient capability to stop reverse flow though the electromagnetic valve II. If the movable valve 70 of the electromagnetic valve II opens; fluid flowing into the flow inlet port 44 can flow out of the flow outlet port 46 via the movable valves 70 of the electromagnetic valves I and II.

If relatively high pressure fluid is supplied to flow outlet port 46 when the movable valve 70 of the electromagnetic valve II is closed, the movable valve 70 of the electromagnetic valve II will be in the state shown in FIG. 4. In other words, the high pressure fluid will cause the main valve 76 of the electromagnetic valve II to be maintained in the closed state. Therefore, the first representative two-way pilot type electromagnetic flow valve 40 can reliably prevent reverse flow from fluid outlet port 46 to fluid inlet port 44 when the fluid pressure at fluid outlet port 46 is greater than the fluid pressure at fluid inlet port 44. However, when reverse flow is desired, electric current is passed through the solenoid coil 60 of the electromagnetic valve II. As a result, reverse flow will be permitted, because the electromagnetic valve II will open and the resulting pressure differential across the main valve 76 of the electromagnetic valve I will force the electromagnetic valve I to open.

As noted above, the first representative two-way pilot type electromagnetic flow valve 40 comprises two pilot type electromagnetic flow valves that are arranged in opposite operational directions. Because this electromagnetic flow valve can be produced by assembling two identical pilot type electromagnetic flow valves into the body 42, the two-way pilot type electromagnetic flow valve of this configuration can be easily manufactured.

For the convenience of explanation, the port of one side 44 was called the flow inlet port and the other port 46 was called the flow outlet port. However, the port of one side 44 could be called the flow outlet port and the other port 46 could be called the flow inlet port without any functional difference. The present valves and piping are completely bi-directional.

Further, although two solenoid coils 60 are provided in the first representative two-way pilot type electromagnetic flow valve 40, passing electric current through only one solenoid coil 60 of either the electromagnetic valve I or II will open the flow path and allow fluids to communicate between port 44 and port 48. Additionally, the flow path can be maintained in the opened state by passing electric current through only one solenoid coil 60. Therefore, energy conservation can be realized by using this two-way pilot type electromagnetic flow valve 40.

In the alternative, the operation of the two solenoid coils 60 can be synchronized and thus, electric current can be passed simultaneously through both solenoid coils 60 of the electromagnetic valves I and II, thereby opening and closing the two-way pilot type electromagnetic flow valve 40. This synchronized operation is particularly effective when the fluid pressure is relatively low.

In the two-way pilot type electromagnetic flow valve 40 of this example, two pilot type electromagnetic flow valves are arranged in series and placed in opposite operational directions. In particular, the two pilot type electromagnetic flow valves are arranged in a straight line, which permits efficient fluid flow through the two-way pilot type electromagnetic flow valve 40. Furthermore, the shape of the two-way pilot type electromagnetic flow valve 40 can be made narrower by arranging the electromagnetic valves I and II in a straight line.

Second Detailed Representative Embodiment

The second representative embodiment will be explained with reference to FIG. 7, which two-way pilot type electromagnetic flow valve 100 has two movable valves. However, the second representative embodiment differs from the first representative embodiment, because the second representative embodiment has only one electromagnetic force generator or solenoid. Therefore, the same reference numerals have been assigned to elements that are identical to elements in the first representative embodiment and only modified portions of the first representative embodiment will be described in the second representative embodiment.

The base 52 of the electromagnetic force generator (solenoid) 50 is fixed to a second body 102. Two movable valves 120, 150 are connected in series via a communication path 108 arranged in a straight line and opposing in the direction of the fluid flow. The movable valve 120 is disposed in a space that communicates with a flow outlet port 104 provided in the second body 102. The movable valve 150 is disposed in a space that communicates with flow inlet port 114 provided in the first body 112.

Figure 7:
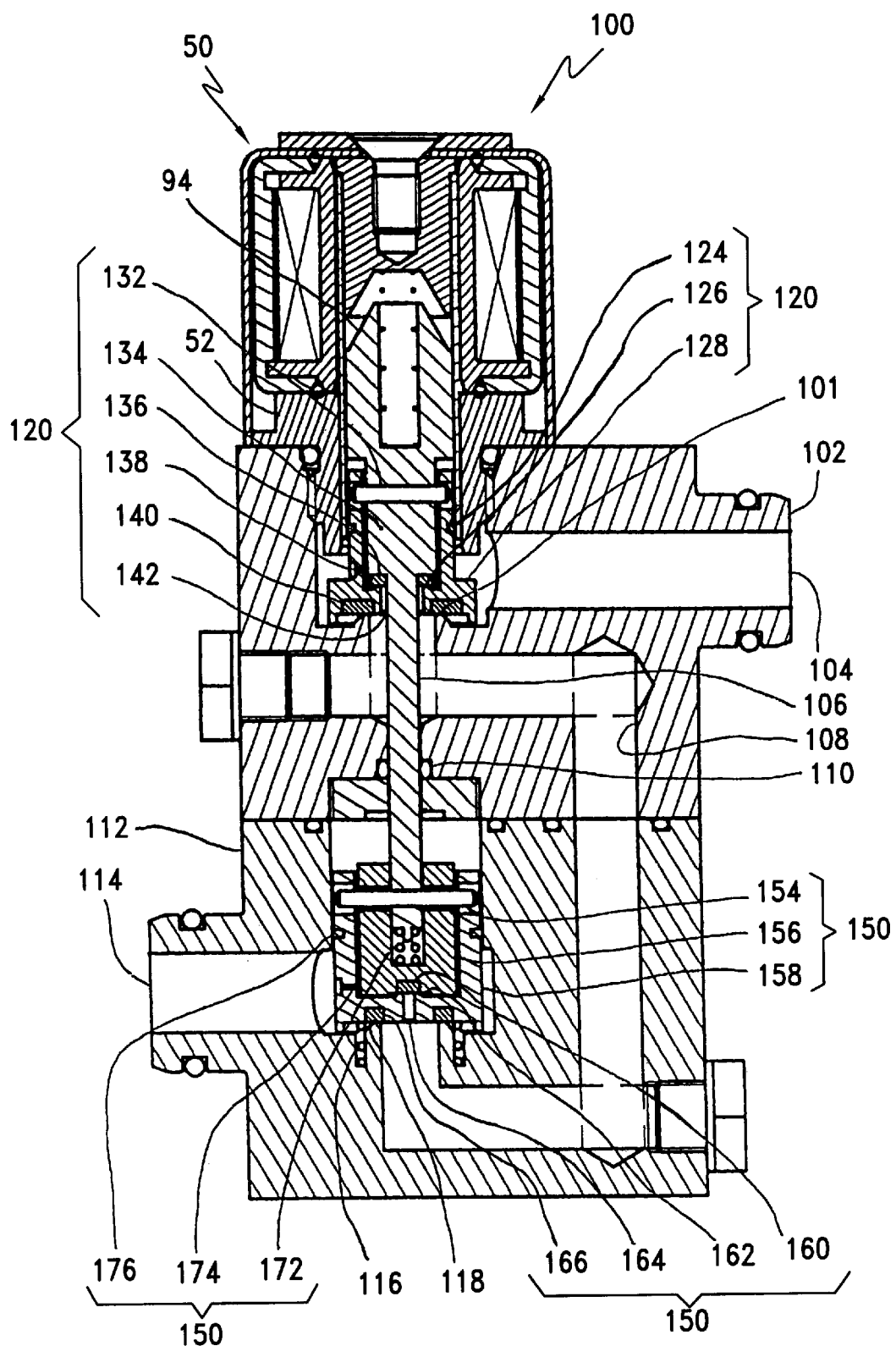
FIG. 7 shows a second representative two-way pilot type electromagnetic flow valve according to the present teachings.

As shown in FIG. 7, the movable valve 150 on the side of flow inlet port 114 includes a pin 154, pilot valve 156, main valve 158, seal 160, valve seat 162, pilot hole 164, seal 166, orifice 174, and a piston ring 176. Although these parts have different shapes than the corresponding parts in the movable valve 70 of the first representative embodiment, the basic structures and operations are substantially the same as the first representative embodiment.

A coupling link 106, which will be explained in further detail below, is slidably inserted into a concave portion defined in the pilot valve 156 of the movable valve 150. A spring 172 is disposed between the bottom surface of the concave portion and the coupling link 106. A pin 154 is attached substantially perpendicularly with respect to the link 106. The pin 154 is connected to the pilot valve 156 with a small clearance. In addition, a spring 116 is disposed between the movable valve 150 and the first body 112. When the main valve 158 is closed, the spring 116 is compressed.

The movable valve 120 on the side of the flow outlet port 104 includes a piston ring 124, valve seat 126, main valve 128, pin 132, pilot valve 134, seal 136, orifice 138, seal 140, and a pilot hole 142. Although these parts have different shapes than the corresponding parts in the movable valve 70 of the first representative embodiment shown in FIG. 3, the basic structures and operations are substantially the same. The coupling link 106 passes through the pilot hole 142 and is connected to the pilot valve 134 to form an integrated unit.

The second representative two-way pilot type electromagnetic flow valve 100 includes a first body 112 and second body 102 that are connected to each other, and a communication path 108 is defined within the first and-second body 102, as shown in FIG. 7. The communication path or passage 108 communicates with both the movable valves 120 and 150. The operational directions of movable valves 120 and 150 are the same in this embodiment. That is, as shown in FIG. 7, main valve 128 moves upwardly in order to open movable valve 120. Likewise, main valve 158 moves upwardly in order to open movable valve 150. Moreover, main valves 128 and 158 will move downwardly in order to close main valves 128 and 158, respectively.

The coupling link 106 is inserted in the pilot valve 156 of the movable valve 150 and is connected to the pilot valve 134 of the movable valve 120. Consequently, the movable valve 150 and the movable valve 120 will move as an integrated unit. In other words, when the movable valve 150 is in opened state, the movable valve 120 is also in an opened state and vice versa.

A representative method for causing the fluid to flow from the flow inlet port 114 to the flow outlet port 104 via the movable valves 150 and 120 will now be explained. First, electric current is passed through solenoid 50. As a result, the movable valve 120 will move upwardly. Moreover, because the coupling link 106 connects the movable valve 150 to the movable valve 120, both movable valves 120 and 150 will move upwardly as an integrated unit. As the plunger 94 is pulled upward in FIG. 7, the movable valve 150 on the side of the flow inlet port 114 and the movable valve 120 on the side of the flow outlet port 104 will both open. Consequently, the fluid flowing in from the flow inlet port 114 can flow out of the flow outlet port 104 after passing through the communication path 108 and the movable valves 120 and 150.

When a relatively high pressure fluid is supplied to the flow outlet port 104 while the movable valve 120 is closed, the high pressure acts in the closing direction of the main valve 128 of the movable valve 120. Consequently, the main valve 128 can be maintained in the closed state. Therefore, the second representative two-way pilot type electromagnetic flow valve 100 also can reliably prevent reverse flow when high pressure fluid is supplied to the flow outlet port 104.

The second representative embodiment utilizes a single electromagnetic force generator 50 to move the movable valves 120 and 150. However, because the valves 120 and 150 are pilot type valves, the electromagnetic force required to open the valves 120 and 150 can be relatively small. Therefore, a relatively small solenoid coil 60 will suffice in the second representative embodiment.

Further, according to the second representative embodiment, the main valve 158 compresses spring 116 when the main valve 158 is closed. The impact of the collision between the main valve 158 and the valve seat 118 can be dampened by the spring 116 when the valve is closed. In addition, because the coupling link 106 is connected to the pilot valve 156 by a spring 172, vibration of the pilot valve 134 can be suppressed even when the movable valve 150. vibrates.

One of the ports 114 was called the flow inlet port and the other port 104 was called the flow outlet port for the convenience of explanation. However, there is no functional difference if one of the ports 114 were to be called the flow outlet port, and the other port 104 were to be called the flow inlet port. The second representative embodiment is also bi-directional.

The second representative two-way pilot type electromagnetic flow valve 100 utilizes two movable valves 120 and 150 that are arranged in a straight line. Consequently, the shape of the two-way pilot type electromagnetic flow valve 100 can be made narrow along the movement path of the movable valves 120 and 150.

Third Detailed Representative Embodiment

Figure 8:
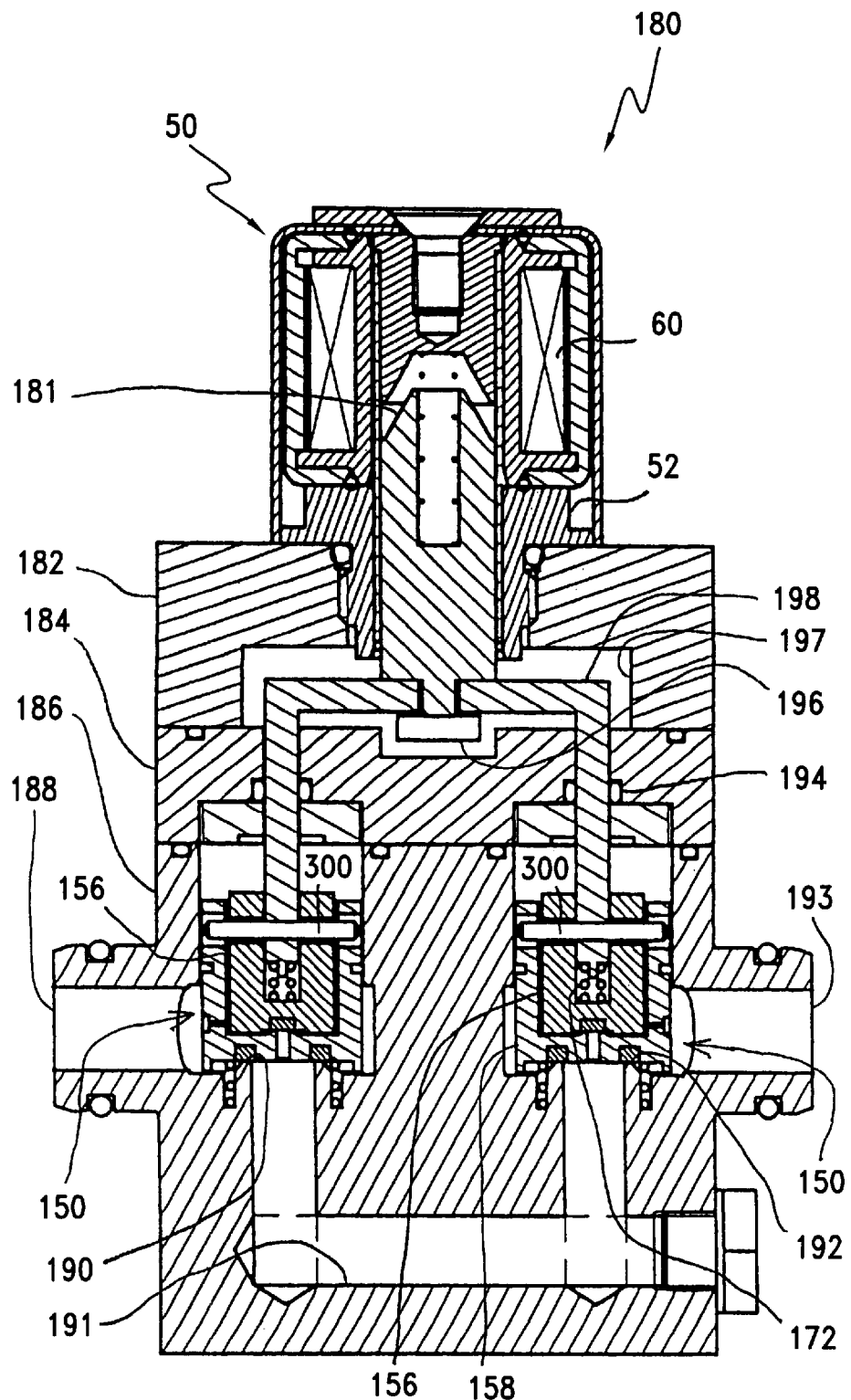
FIG. 8 shows a third representative two-way pilot type electromagnetic flow valve according to the present teachings.

The third representative embodiment will be explained with reference to FIG. 8, which two-way pilot type electromagnetic flow valve 180 has two movable valves that are disposed in parallel. Because other portions of the construction are substantially similar to the first and second representative embodiments, the same reference numerals have been assigned to elements that are identical to elements in the first and second representative embodiments and only modified portions of the first and second representative embodiments will be described in the third representative embodiment.

The base 52 of the electromagnetic force generator (solenoid) 50 is fixed to a second body 182. The two movable valves 150 are respectively disposed in a space that communicates with the flow inlet port 188 defined in the first body 186 and in a space that communicates with the flow outlet port 193 defined in the first body 186. A communication path 191 is defined in the first body 186. The two movable valves 150 are connected in series via the communication path 191 arranged in opposite directions. In other words, the movable valves 150 are arranged in the same direction spatially, but in opposite orientations with respect to the direction of the flow path. However, both movable valves 150 will move upwardly, as shown in FIG. 8, in order to permit fluids to be communicated between port 188 and port 193.

A coupling link 198 is inserted into the concave portion provided on each pilot valve 156 of the two movable valves 150. A pin 300 connects the coupling link 198 to the pilot valve 156. The coupling link 198 is fixed to the plunger 181 by an attachment part 196. Thus, the two movable valves 150 will move as an integrated unit. In other words, when one of the movable valves 150 is in the opened state, the other movable valve 150 is also in the opened state. Similarly, when one of the movable valves 150 is in the closed state, the other movable valve 150 is also in the closed state.

In addition, the coupling link 198 is slidably supported within a third body 184, which third body 184 is connected to the first body 186 and the second body 182. A seal 194 is disposed in the space between the coupling link 198 and the third body 184. The third body 184 (more accurately the seal part 194) provides an airtight seal between the space on the side of the movable valves 150 and the space 197 on the side of the plunger 181.

A representative method for causing fluid to flow from the flow inlet port 188 to the flow outlet port 193 via the two movable valves 150 will now be explained. First, electric current is passed through solenoid coil 60, thereby energizing the solenoid coil 60. The two movable valves 150 are connected by the coupling link 198. Therefore, as the plunger 181 is pulled upward in FIG. 8, the two movable valves 150 move upward as an integrated unit. As a result, the movable valve 150 on the side of the flow inlet port 188 and the movable valve 150 on the side of the flow outlet port 193 will both open. Consequently, fluid flowing in from the flow inlet port 188 can flow out from the flow outlet port 193, after flowing through the communication path 191 and passing through the two movable valves 150.

When the fluid pressure supplied to the flow outlet port 193 is greater than the fluid pressure supplied to flow inlet port 188 and the movable valve 150 closest to the flow outlet port 193 is closed, the fluid pressure differential acts to close the main valve 158 of the movable valve 150 on the side of the flow outlet port 193. Consequently, the main valve 158 can maintain its closed state. Therefore, the third representative two-way pilot type electromagnetic flow valve 180 can prevent reverse flow when a relatively high pressure fluid is applied to the flow outlet port 193. On the other hand, if reverse flow from the flow outlet port 193 to the flow inlet port 188 is desired, the solenoid coil 60 can be energized and the pilot valves 156 will open. When the pilot valve 156 of the movable valve 150 on the side of the flow outlet port 193 is opened, reverse flow from the flow outlet port 193 to the flow inlet port 188 is allowed.

Preferably, the two movable valves 150 are pilot type valves. Thus, a small electromagnetic force would be adequate to open the main valves 158 and a relatively small solenoid coil 60 will suffice. Further, a spring 172 preferably supports the coupling link 198 in the third representative two-way pilot type electromagnetic flow valve 180. Therefore, vibration of the two movable valves 150 can be suppressed.

As in the first and second representative embodiments, one of the ports 188 was called the flow inlet port and the other port 193 was called the flow outlet port for the convenience of explanation. However, there is no functional difference if one of the ports 188 were to be called the flow outlet port, and the other port 193 were to be called the flow inlet port. The third representative embodiment is also completely bi-directional.

In the two-way pilot type electromagnetic flow valve 180, the two movable valves 150 are arranged in parallel. Therefore, the height of the valve 180 can be reduced in this configuration.

Fourth Detailed Representative Embodiment

The fourth representative embodiment will be explained with reference to FIG. 9, which two-way pilot type electromagnetic flow valve 200 has two movable valves that are disposed in parallel. Because other portions of the construction are substantially similar to the first, second and third representative embodiments, the same reference numerals have been assigned to elements that are identical to elements in the first, second and third representative embodiments and only modified portions of the first, second and third representative embodiments will be described in the fourth representative embodiment.

The base 52 of the electromagnetic force generator (solenoid) 50 is fixed to a first body 208. The two movable valves 230 are respectively disposed in a space that communicates with flow inlet port 210 and in a space that communicates with flow outlet port 228 provided in a first body 208. A communication path 218 is defined between the first body 208 and the second body 214, which is connected at the bottom edge of the first body 208. A coupling link 224 is disposed inside the communication path 218, which coupling link 224 will be explained in further detail below. Additionally, a third body 206 is connected to the upper edge of the first body 208. The third body 206 includes a pair of slide guides 204. A small diameter portion 249 of a pilot valve 244, which will be explained below, is slidably mounted within the slide guide 204. A spring 202 is disposed between the pilot valve 244 and the third body 206.

Figure 9:
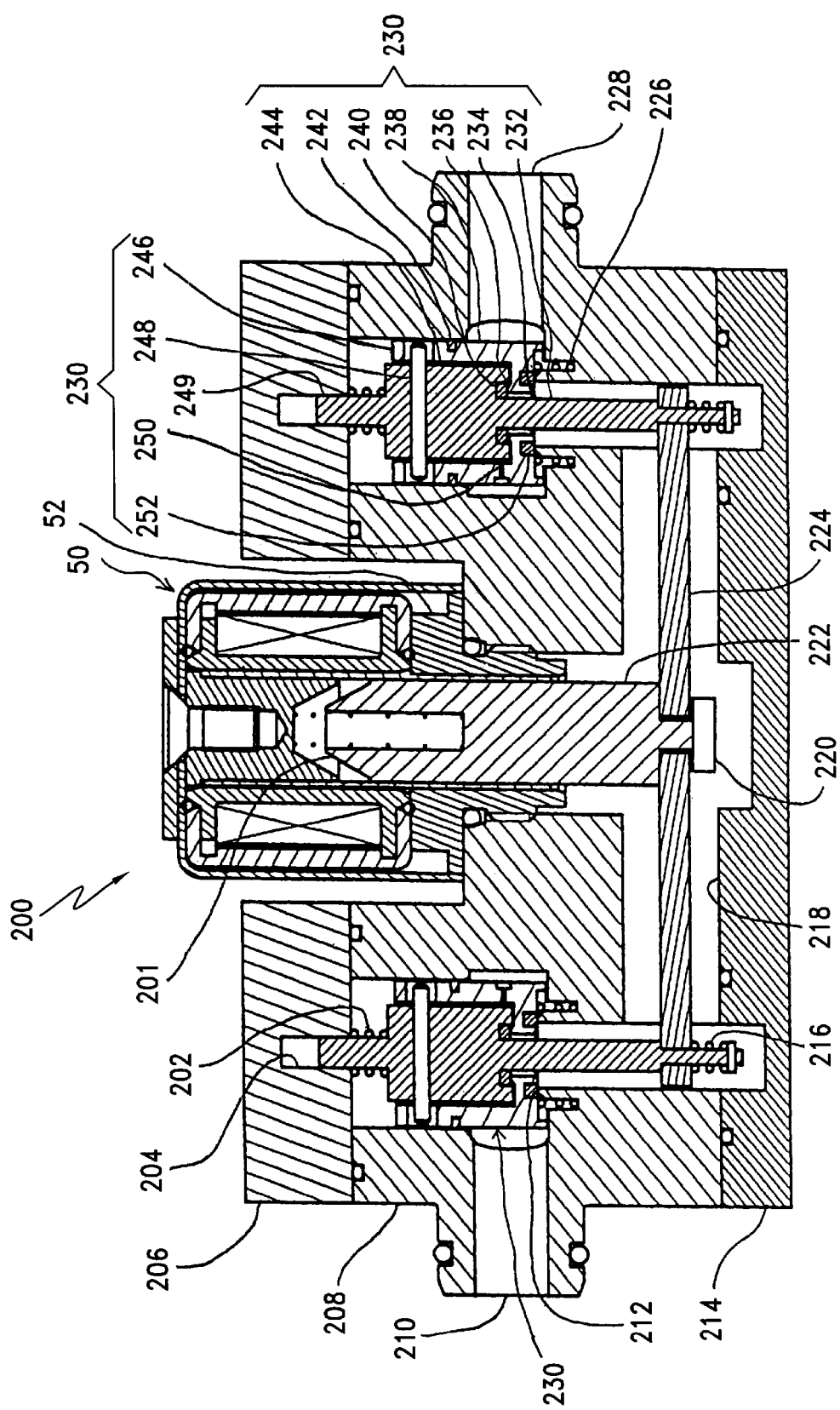
FIG. 9 shows a fourth representative two-way pilot type electromagnetic flow valve according to the present teachings.

As shown in FIG. 9, both movable valves 230 preferably include a pilot hole 234, valve seat 236, main valve 238, seal 240, piston ring 242, pilot valve 244, pin 248, orifice 250, and a seal 252. Although these parts have different shapes than the corresponding parts in the movable valve 70 of the first representative embodiment shown in FIG. 3, the basic structures and operations are substantially the same.

However, in the fourth representative embodiment, each pilot valve 244 includes a first small diameter portion 232 and a second small diameter portion 249. The first small diameter part 232 passes through the pilot hole 234 and is connected to the coupling link 224. A spring 216 supports the first small diameter part 232 and the coupling link 224. Additionally, the coupling link 224 is fixed to the plunger 222 by an attachment part 220. The second small diameter part 249 is slidably inserted within the slide guide 204.

The operation of the two-way pilot type electromagnetic flow valve 200 and the action of the fluid when the movable valve 230 is opened and closed are substantially the same as the third embodiment. Thus, a detailed explanation of the operation of the fourth representative embodiment is not necessary.

The fourth representative two-way pilot type electromagnetic flow valve 200 has two movable valves 230 arranged in parallel, which is the same as the third representative two-way pilot type electromagnetic flow valve 180. However, in the fourth representative embodiment, the coupling link 224 that connects the two movable valves 230 does not slide on the wall separating the areas having different pressures. In other words, the plunger 201, the coupling link 224 and the small diameter part 232 are disposed inside the communication path 218. Therefore, because the coupling link 224 does not slide between spaces under different pressures, the seal 194, which was provided for the coupling link utilized in the third representative two-way pilot type electromagnetic flow valve 180, is not necessary. Further, the fourth representative two-way pilot type electromagnetic flow valve 200 does not require seals for the coupling link 224 and the first small diameter part 232. Consequently, the sliding resistance that occurs during the opening and closing of the valve can be reduced.

As described above, in the fourth representative two-way pilot type electromagnetic flow valve 200, the spring 216 supports the pilot valve 230 (more accurately the small diameter part 232) and the coupling link 224. Consequently, vibration of the pilot valve 244 caused by the vibration of the two-way pilot type electromagnetic flow valve 200 can be suppressed.

In addition, a spring 202 is provided between the third body. 206 and the pilot valve 244. Therefore, the collision between the rising pilot valve 244 and the third body 206 when the valve is opened can be prevented. Additionally, the spring 202 can suppress or dampen vibration of the pilot valve 244.

As in the previous three representative embodiments, one of the ports 210 was called the flow inlet port and the other port 228 was called the flow outlet port for the convenience of explanation. However, there is no functional difference if one of the ports 210 were to be called the flow outlet port, and the other port 228 were to be called the flow inlet port. Therefore, it is possible to switch to a state allowing reverse flow as necessary, because all four representative embodiments are completely bi-directional.

What is claimed is:

1. A bi-directional piping, comprising:
a body having a fluid communication path defined therein,
a first electromagnetic valve disposed within the fluid communication path and comprising a first main valve and a first pilot valve defined within the first main valve, wherein the first main valve has a valve opening direction,
a second electromagnetic valve disposed within the fluid communication path and comprising a second main valve and a second pilot valve defined within the second main valve, wherein the second main valve has a valve opening direction, wherein the valve opening directions of the first and second main valves are oppositely disposed within the fluid communication path and the first and second electromagnetic valves are arranged in parallel.

2. A bi-directional piping as described in claim 1, further comprising a single solenoid coil that operates both the first and second electromagnetic valves.

3. A bi-directional piping as described in claim 2, further comprising a coupling link that couples the first and second pilot valves.

4. A bi-directional piping as described in claim 3, further comprising a spring that couples the first and second pilot valves and the coupling link.

5. A bi-directional piping as described in claim 3, wherein the coupling link is disposed within the fluid communication path.

6. A bi-directional piping as in claim 1, further comprising a spring that biases the first pilot valve.

7. A bi-directional piping as described in claim 1, further comprising a first solenoid coil and a second solenoid coil respectively operating the first and second electromagnetic valves.

8. An apparatus, comprising:
a body defining a fluid communication path having a first port and a second port,
a first pilot-assisted electromagnetic flow valve disposed within the fluid communication path and having a first main valve that opens and closes the first port,
a second pilot-assisted electromagnetic flow valve disposed within the fluid communication path and having a second main valve that opens and closes the second port, wherein the first and second pilot-assisted electromagnetic flow valves are disposed in series within the fluid communication path between the first port and the second port, but the first main valve and the second main valve open in opposing directions within the fluid communication path, and
a single solenoid coil arranged and constructed to operate both the first and second electromagnetic valves.

9. An apparatus as described in claim 8, further comprising a coupling link that couples the first and second pilot valves.

10. An apparatus as described in claim 9, wherein the coupling link is disposed within the fluid communication path.

11. An apparatus as in claim 8, wherein the first pilot-assisted electromagnetic flow valve has a first valve opening/closing direction and the second pilot-assisted electromagnetic flow valve has a second valve opening/closing direction that is substantially parallel to the first valve opening/closing direction.

12. An apparatus as in claim 9, wherein the first pilot-assisted electromagnetic flow valve has a first valve opening/closing direction, the second pilot-assisted electromagnetic flow valve has a second valve opening/closing direction that is substantially parallel to the first valve opening/closing direction.

13. An apparatus as in claim 10, wherein the first pilot-assisted electromagnetic flow valve has a first valve opening/closing direction, the second pilot:assisted electromagnetic flow valve has a second valve opening/closing direction that is substantially parallel to the first valve opening/closing direction.

14. A bi-directional pilot type electromagnetic flow valve, comprising:
a fluid path defined by a flow inlet port at one end and a flow outlet port at a second end,
a first pilot type electromagnetic flow valve disposed within the fluid path and comprising a first main valve that selectively opens and closes the flow inlet port, and
a second pilot type electromagnetic flow valve disposed within the fluid path and comprising a second main valve that selectively opens and closes the flow outlet port, wherein the first and second pilot type electromagnetic flow valves are disposed in series within the flow path between the flow inlet port and the flow outlet port, the main valves open in opposing directions with respect to fluid flow within the fluid path and the first pilot type electromagnetic flow valve has a valve opening/closing direction that is substantially parallel to a valve opening/closing direction of the second pilot type electromagnetic flow valve.

15. A bi-directional pilot type electromagnetic flow valve, comprising:
a body having a flow inlet port and flow outlet port,
a first pilot type electromagnetic flow valve disposed within the body,
a second pilot type electromagnetic flow valve disposed within the body, wherein the first and second pilot type electromagnetic flow valves are disposed in series, and the arrangement of the flow inlet port and the first pilot type electromagnetic flow valve is same as the arrangement of the flow outlet port and the second pilot type electromagnetic flow valve, whereby the flow inlet port may be used as the flow outlet port and the flow outlet port may be used as the flow inlet port, and
a single solenoid coil arranged and constructed to operate both the first and second pilot type electromagnetic flow valves.

16. A bi-directional pilot type electromagnetic flow valve as described in claim 15,
wherein the first pilot type electromagnetic flow valve comprises a first main valve having a first pilot hole and a first pilot valve for selectively opening and closing the first pilot hole, the second pilot type electromagnetic flow valve comprises a second main valve having a second pilot hole and a second pilot valve for selectively opening and closing the second pilot hole, the first main valve is located between the flow inlet port and the first pilot valve, and the second main valve is located between the flow outlet port and the second pilot valve.

17. A bi-directional pilot type electromagnetic flow valve as described in claim 15,
wherein the first pilot type electromagnetic flow valve comprises a first main valve having a first pilot hole and a first pilot valve for selectively opening and closing the first pilot hole, the second pilot type electromagnetic flow valve comprises a second main valve having a second pilot hole and a second pilot valve for selectively opening and closing the second pilot hole, the first pilot valve is located between the flow inlet port and the first main valve, and the second pilot valve is located between the flow outlet port and the second main valve.

18. A two-way piping arrangement, comprising:

a pipe having a flow inlet port and a flow outlet port, first and second pilot type electromagnetic flow valves disposed in series between the flow inlet port and the flow outlet port, such that the relationship between the flow inlet port and the first pilot type electromagnetic flow valve is same as the relationship between the flow outlet port and the second pilot type electromagnetic flow valve, whereby the flow inlet port may be used as the flow outlet port and the flow outlet port may be used as the flow inlet port, and a single solenoid coil arranged and constructed to operate both the first and second pilot type electromagnetic flow valves.

19. A two way piping as described in claim 18, wherein the first pilot type electromagnetic flow valve comprises a first main valve having a first pilot hole and a first pilot valve for selectively opening and closing the first pilot hole, the second pilot type electromagnetic flow valve comprises a second main valve having a second pilot hole and a second pilot valve for selectively opening and closing the second pilot hole, the first main valve is located between the flow inlet port and the first pilot valve, and the second main valve is located between the flow outlet port and the second pilot valve.

20. A two way piping as described in claim 18, wherein the first pilot type electromagnetic flow valve comprises a first main valve having a first pilot hole and a first pilot valve for selectively opening and closing the first pilot hole, the second pilot type electromagnetic flow valve comprises a second main valve having a second pilot hole and a second pilot valve for selectively opening and closing the second pi lot hole, the first pilot valve is located between the flow inlet port and the first main valve, and the second pilot valve is located between the flow outlet port and the second main valve.

* * * * *

UNITED STATES PATENT AND TRADEMARK OFFICE
CERTIFICATE OF CORRECTION

PATENT NO. : 6,520,206 B2
DATED : February 18, 2003
INVENTOR(S) : Akihisa Hotta et al.

It is certified that error appears in the above-identified patent and that said Letters Patent is hereby corrected as shown below:

Drawings,
Sheet 3, FIG. 3, the reference numeral "90" should be changed to reference numeral -- 94 --.

Signed and Sealed this

Twenty-second Day of July, 2003

JAMES E. ROGAN
*Director of the United States Patent and Trademark Office*